United States Patent
Teixeira et al.

(10) Patent No.: US 12,098,888 B2
(45) Date of Patent: Sep. 24, 2024

(54) HORIZONTAL-AXIS HEAT RECOVERY AND STORAGE SYSTEM

(71) Applicant: IFP Energies nouvelles, Rueil-Malmaison (FR)

(72) Inventors: David Teixeira, Rueil-Malmaison (FR); Navid Saeedi, Rueil-Malmaison (FR); Yacine Haroun, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 353 days.

(21) Appl. No.: 17/623,553

(22) PCT Filed: Jun. 25, 2020

(86) PCT No.: PCT/EP2020/067827
§ 371 (c)(1),
(2) Date: Dec. 28, 2021

(87) PCT Pub. No.: WO2021/001251
PCT Pub. Date: Jan. 7, 2021

(65) Prior Publication Data
US 2022/0252356 A1    Aug. 11, 2022

(30) Foreign Application Priority Data
Jul. 4, 2019    (FR) ..................... 1907459

(51) Int. Cl.
*F28D 20/00*    (2006.01)
*F03G 7/04*    (2006.01)

(52) U.S. Cl.
CPC .......... *F28D 20/0056* (2013.01); *F03G 7/04* (2013.01); *F28D 2020/0082* (2013.01)

(58) Field of Classification Search
CPC .. F28D 20/0056; F28D 20/02; F28D 20/0034; F28D 2020/0082; F28D 2020/0086; F03G 7/04; Y02E 60/14; Y02E 60/16; F02C 6/16
See application file for complete search history.

(56) References Cited

U.S. PATENT DOCUMENTS
2018/0016984 A1 * 1/2018 Deleau ...................... F02C 6/18
2020/0386491 A1 * 12/2020 Plais ................... F28D 20/0056

FOREIGN PATENT DOCUMENTS
| | | | |
|---|---|---|---|
| FR | 3014182 A1 | 6/2015 | |
| FR | 3034813 A1 | 10/2016 | |
| FR | 3044751 A1 * | 6/2017 | ............... F02C 6/16 |
| WO | 2017198397 A1 | 11/2017 | |

* cited by examiner

*Primary Examiner* — Emmanuel E Duke
(74) *Attorney, Agent, or Firm* — FITCH, EVEN, TABIN & FLANNERY, LLP

(57) ABSTRACT

A heat storage and recovery system and process includes at least one cylindrical external wall, at least one first volume, at least one second volume and at least two fluid injection/withdrawal devices. The first and second volumes are separated by at least one heat storage system comprising at least one bed of heat storage particles. Furthermore, the storage system and the first and second volumes extend substantially over the entire axial length of the cylindrical external wall. The longitudinal axis of the said cylindrical external wall is horizontal.

A system and a process for the storage and recovery of energy by compressed gas include such a heat storage means.

20 Claims, 4 Drawing Sheets

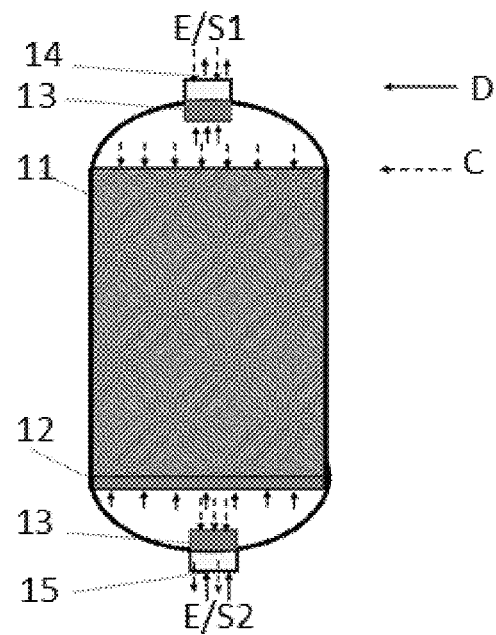
[Fig 1]

[Fig 2]
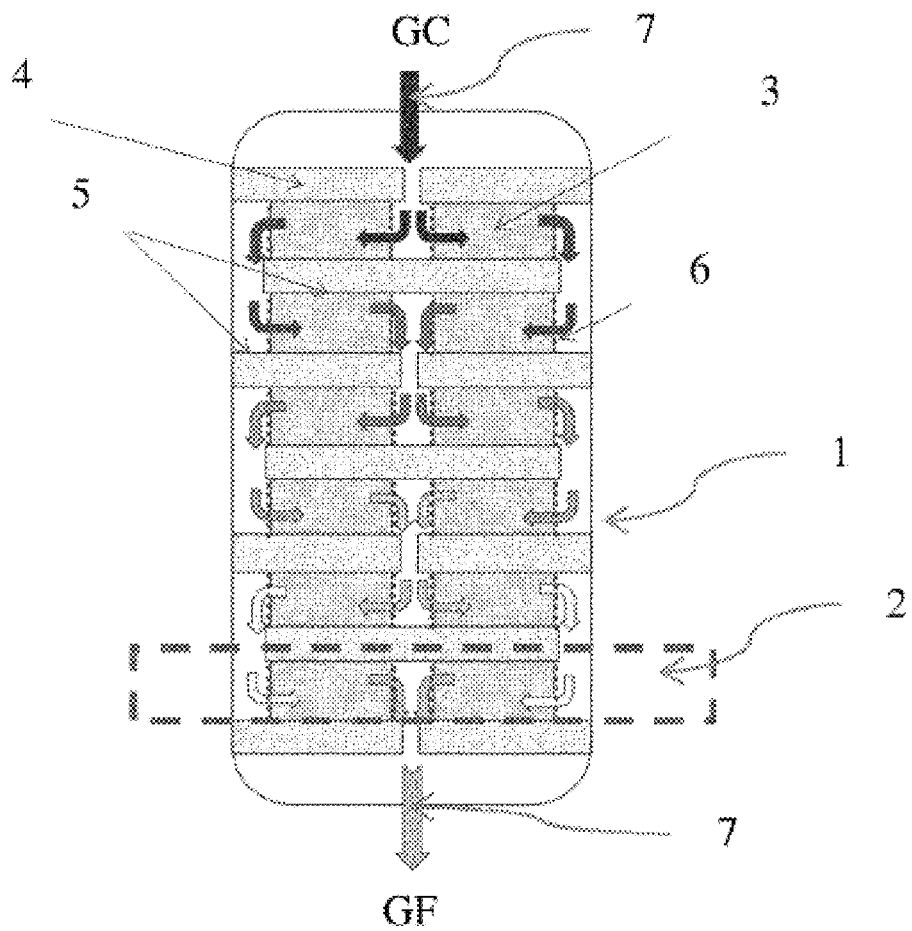
[Fig 3]
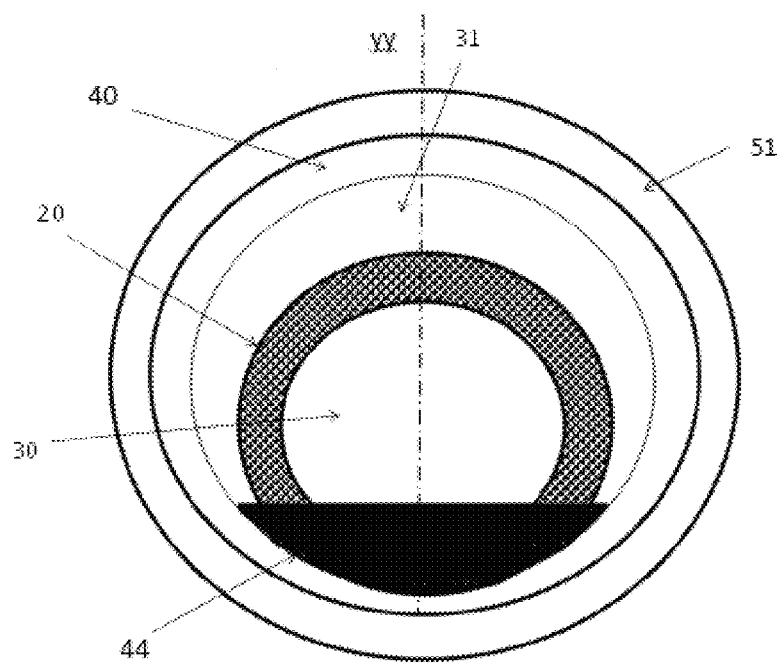

[Fig 4]
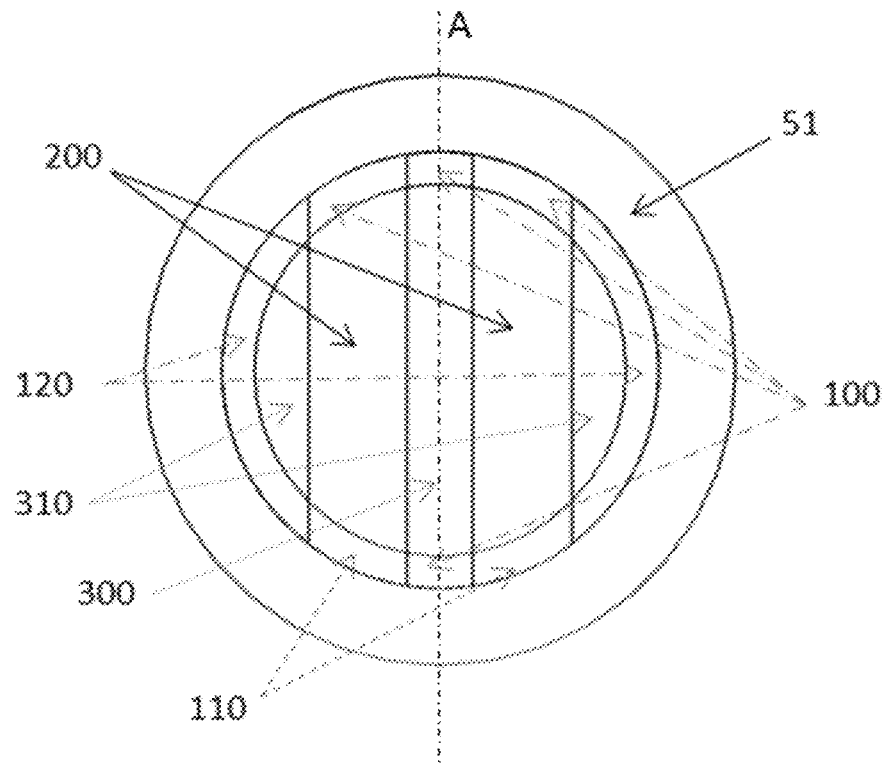
[Fig 5]
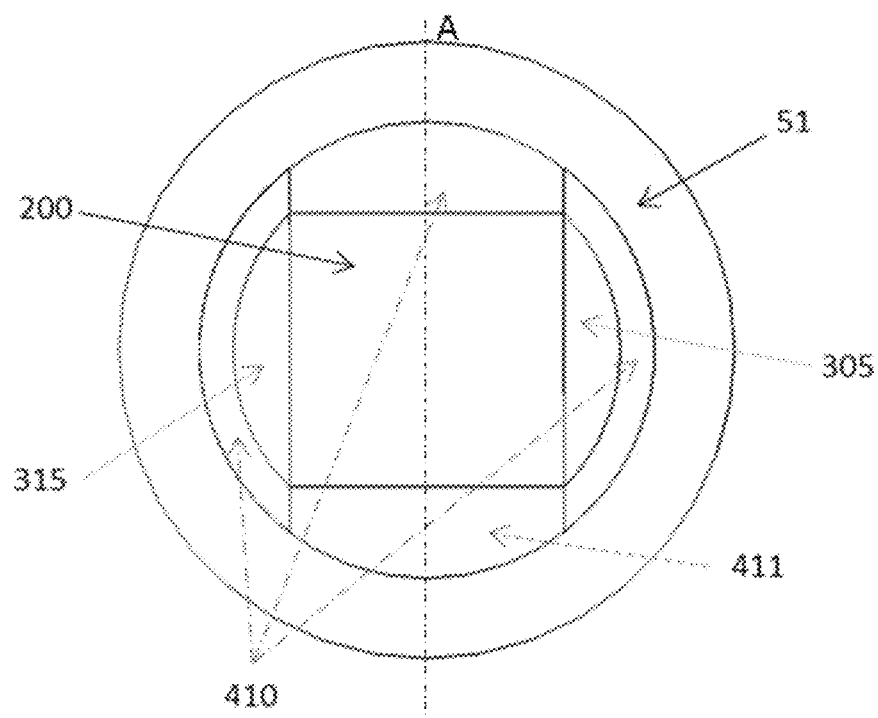

HORIZONTAL-AXIS HEAT RECOVERY AND STORAGE SYSTEM

CROSS-REFERENCE TO RELATED APPLICATIONS

This application is a U.S. national phase application filed under 35 U.S.C. § 371 of International Application No. PCT/EP2020/067827, filed Jun. 25, 2020, designating the United States, which claims priority from French Patent Application No. 19/07.459 filed Jul. 4, 2019, the entirety of each of which is incorporated herein by reference.

TECHNICAL FIELD

The present invention relates mainly to the field of the storage of energy by compressed air but might apply to other pressurized tank systems.

The production of electricity from renewable energy, for example via solar panels, or onshore or offshore wind farms, has been advancing rapidly. The main disadvantages of these production means are intermittent production and the possible lack of matching between the production period and the consumption period. It is thus important to have available a system for the storage of energy during production in order to restore it during a consumption period.

There are numerous technologies which make this balance possible.

The best known among them is pumped-storage hydroelectricity (PSH), which consists of the use of two reservoirs of water at different altitudes. The water is pumped from the lower basin to the upper basin during the charging phase. The water is subsequently sent to a turbine, in the direction of the lower basin, during discharging.

The use of batteries of different types (lithium, nickel, sodium-sulfur, lead-acid, and the like) can also meet this need for energy storage.

Another technology, flywheel energy storage (FES), consists of accelerating a rotor (flywheel) to a very high speed and in keeping the energy in the system in the form of kinetic energy. When energy is extracted from this FES system, the rotational speed of the flywheel is reduced according to the principle of conservation of energy. The addition of energy to the FES system consequently results in an increase in the speed of the flywheel.

The technology for storage of energy by use of a compressed gas (often compressed air) is promising. The energy produced and not consumed is used to compress air to pressures of between 40 bar and 200 bar using compressors (which can be multistage compressors). During the compression, the temperature of the air increases. In order to limit the cost of the storage tanks and to minimize the consumption of electricity of the compressor, the air can be cooled between each compression stage. The compressed air is then stored under pressure, either in natural cavities (caves) or in artificial tanks.

There exists a variant in development. It is an "adiabatic" process in which the heat resulting from the compression of the air is recovered, stored and restored to the air before expanding it. It is the AACAES (Advanced Adiabatic Compressed Air Energy Storage) technology.

In an AACAES system, the compressed air is stored in a tank independently of the heat storage. In such a system, the air is stored at a temperature close to ambient temperature (a priori less than 50° C.).

In some designs envisaged for AACAES, the heat is stored using a heat-exchange fluid which makes it possible to store the heat resulting from the compression of the air and to restore it to the air before its expansion by means of heat exchangers.

According to other designs envisaged for AACAES, the heat is stored by means of static solids contained in one or more containers. For example, the heat is stored in a material in the form of particles, known as "heat storage particles", in a fixed bed positioned in one or more containers, and through which the air to be cooled passes. This heat is restored to the cold air which passes through the fixed bed in the opposite direction during a discharging phase.

In all cases, such a system for the storage of energy by compressed air requires one or more tanks, subsequently known as TES (Thermal Energy Storage) tanks, which is at least simultaneously resistant to pressure, resistant to the storage temperature and leak-tight to the gas moving in the TES tank. The resistance to the pressure is in particular a major challenge since the pressures for the storage of compressed air are at least equal to 100 bar.

PRIOR ART

[FIG. 1] exhibits a known system for the storage and recovery of heat composed of a cylindrical column, the longitudinal axis of which is vertical. This column is equipped with a fixed bed of heat storage particles 11, these heat storage particles being, for example, solid elements, with a bed-support grid 12 and with a means for diffusion of the fluid jet 13. For very high columns, the solid bed can be composed of several bed sections supported by several grids, in order to distribute the weight of the beds over several horizontal grids.

The heat-exchange fluid can be introduced via the top or the bottom of the column. For example, during the charging period C, the gas can be introduced via the top of the column 14 at a temperature between 100 and 600° C. and exits from the bottom of the column 15 at a temperature between 50 and 200° C. During the discharging period D, the heat-exchange fluid, for example air, is introduced via the bottom of the column 15 at a temperature of approximately 50 to 100° C. and exits from the column via the top 14. The durations of the cycle of charging C, discharging D and pause vary as a function of the process. They can be several minutes, several hours or several days, indeed even several months.

According to one alternative form, as described in Patent Application FR 3 014 182, several systems for the storage and recovery of heat can be used, each of them having a suitable storage temperature. However, this system has the disadvantage of being complex and expensive.

Also known is the heat storage and recovery system described in Patent Application FR 3 044 751 and represented in [FIG. 2]. The system 1 comprises several beds 2 of storage particles 3 positioned vertically one under the other and separated by plates 4 and 5. These beds are positioned in a cylindrical column, the longitudinal axis of which is vertical or substantially vertical. These plates 4 and 5 comprise openings in order to make it possible for the fluid to pass through them. Furthermore, these openings are used to guide the fluid in order for the latter to pass through the various stages of the bed of storage particles 3, radially. The hot fluid GC for example arrives by the inlet 7 located at the top of the heat storage and recovery system 1. It passes radially through the various stages of bed of storage particles 3, alternately from the inside towards the outside and then from the outside towards the inside (or vice versa). It then emerges colder (GF) via the outlet 7 located at the bottom of the heat storage and recovery system 1. The system can also comprise distribution means 6 for the entry of fluid into and/or the exit of fluid from the various beds 2.

As explained above, these systems of the prior art are arranged in a position for which the axis of revolution is vertical. This arrangement is particularly problematic for handling operations since lifting appliances suited to the great height of these vertical columns (of the order of 20 to 25 m, for example) are then necessary, for example large-sized cranes. This is all the truer when the internal elements of the columns (grids, beds of particles) are fitted directly on the spot.

Furthermore, this vertical arrangement is a particular nuisance since its great height renders it visible at a great distance.

It is thus a subject-matter of the invention to facilitate the lifting/handling operations and the fitting of the column and moreover to reduce the visual bulk of the system.

In order to do this, the invention relates to a heat storage and recovery system comprising at least one cylindrical external wall, at least one first volume, at least one second volume and at least two fluid injection/withdrawal means. The first and second volumes are separated by at least one heat storage means comprising at least one bed of heat storage particles. Furthermore, the storage means and the first and second volumes extend substantially over the entire axial length of the cylindrical external wall. The longitudinal axis of the said cylindrical external wall is horizontal.

The invention also relates to a system for the storage and recovery of energy by compressed gas comprising at least one gas compression means, at least one means of storage of the compressed gas, at least one means of expansion of the compressed gas in order to generate energy, and at least one means of storage of heat according to one of the preceding characteristics.

The invention also relates to a process for the storage and recovery of energy by compressed air comprising at least the following stages:
 a stage of compression of a gas,
 a stage of storage and recovery of heat in a heat storage and recovery system as defined above,
 a stage of storage of the compressed gas,
 a stage of expansion of the compressed gas.

SUMMARY OF THE INVENTION

The invention relates to a heat storage and recovery system comprising at least one cylindrical external wall, the heat storage and recovery system comprising at least one first volume, at least one second volume and at least two fluid injection/withdrawal means, the said first and second volumes being separated by at least one heat storage means comprising at least one bed of heat storage particles. Furthermore, the said heat storage means and the said first and second volumes extend substantially over the entire axial length of the cylindrical external wall. The longitudinal axis of the said cylindrical external wall is horizontal.

Advantageously, the system comprises a thermal insulation positioned on the internal surface of the said cylindrical external wall. This thermal insulation can comprise rock wool or glass wool, for example.

Preferentially, the system comprises at least one distribution means, such as a distributor, for example a wall having evenly distributed orifices, extending along the heat storage means, on at least one surface of the storage means facing the said first or second volume; preferably, the system comprises two distribution means on a surface of the heat storage means facing the said first volume and on a surface of the heat storage means facing the second volume.

According to one implementation of the invention, at least one distribution means comprises porous walls or walls having orifices.

Preferably, the cross section, preferably radial cross section, of the said heat storage means has a substantially constant width.

According to one embodiment of the invention, each heat storage means is delimited by two substantially vertical planes.

Advantageously, each heat storage means has a substantially rectangular section, preferably a square section.

According to an alternative form of the invention, the system comprises two heat storage means, the said two heat storage means being symmetrical with respect to the vertical axis passing through the centre of the cylindrical external wall.

Advantageously, the heat storage means is set down on a horizontal slab.

According to one implementation of the system according to the invention, the storage means comprises a pipe portion off-centre with respect to the axis of the cylindrical external wall.

The invention also relates to a system for the storage and recovery of energy by compressed gas comprising at least one gas compression means, at least one means of storage of the compressed gas, at least one means of expansion of the said compressed gas in order to generate energy, and at least one heat storage and recovery system according to one of the preceding characteristics.

Advantageously, the gas is air, preferably air of the ambient environment.

In addition, the invention relates to a process for the storage and recovery of energy by compressed air comprising at least the following stages:
 a stage of compression of a gas,
 a stage of storage and recovery of heat in a heat storage and recovery system according to one of the preceding characteristics,
 a stage of storage of the compressed gas,
 a stage of expansion of the compressed gas.

LIST OF THE FIGURES

Other characteristics and advantages of the device according to the invention will become apparent on reading the description below of non-limiting implementational examples, with reference to the appended figures described below.

FIG. 1 represents a first heat storage and recovery system according to the prior art.

FIG. 2 represents a second heat storage and recovery system according to the prior art.

FIG. 3 represents an axial sectional drawing of a first embodiment of a heat storage and recovery system according to one embodiment of the invention.

FIG. 4 represents an axial sectional drawing of a second embodiment of a heat storage and recovery system according to one embodiment of the invention.

FIG. 5 represents an axial sectional drawing of a third embodiment of a heat storage and recovery system according to one embodiment of the invention.

DESCRIPTION OF THE EMBODIMENTS

Figure 6:
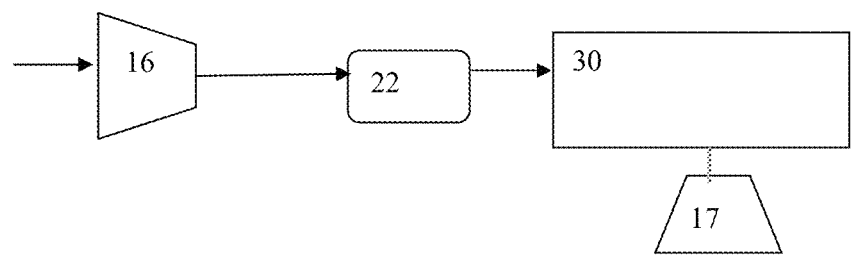
FIG. 6 represents a system for the storage and recovery of energy by compressed gas according to one embodiment of the invention.

In order to meet the objective of lifting/handling, on the one hand, and the reduction in the visual bulk, on the other hand, several avenues could be envisaged:

that which comes first consists of reducing the height of the column and increasing its diameter in order to retain the same storage tank volume. However, to increase the diameter of the tank resistant to internal pressures of more than 100 bar, preferably of the order of 125 bar, implies markedly increasing the thickness of the wall of the tank in order to provide the pressure resistance. This increase in the thickness has a harmful impact on the cost of the installation, such that the system becomes economically ineffective. Furthermore, to reduce the height of the column leads to the reduction in the height of the bed of particles. This results in a greater variation in temperature over a reduced height, which is not desirable. Thus, in order to provide good heat storage, it is necessary to provide good distribution of the fluid over the entire diameter of the column and it is necessary to provide distribution means for this. For example, it can be a distributor, such as a wall having evenly distributed orifices. Moreover, the low height of the bed of storage particles results in a thermal gradient over a fairly short length. The heat storage and recovery performance qualities are thus reduced. This solution is thus not satisfactory.

the second solution consists of positioning the column with the axis horizontal, that is say in positioning the longitudinal axis of the column colinear or substantially colinear with the horizontal axis. Thus, it is possible to benefit from a relatively reduced height (limited by the diameter of the column) and to increase the width of the system, in particular in order to maintain the thermal performance qualities of the bed of storage particles, without a negative impact on the thickness of the wall and thus on its cost. However, this solution is not obvious. This is because:

if the system of [FIG. 1] is positioned with the axis horizontal, the weight of the bed of storage particles will be entirely absorbed by the cylindrical external wall of the system, which already absorbs the strains related to the internal pressure. Moreover, in order to prevent the entire height of the bed from becoming packed down, grids would have to be provided on the horizontal axis, which it will be difficult to install in the diameter of the cylindrical external wall. Thus, to place the system of [FIG. 1] requires major modifications in order to be able to be positioned with the axis horizontal.

if the system of [FIG. 2] is positioned with the axis horizontal, the beds will rest on the distribution means 6, which are not initially expected to absorb the load related to the weights of the beds. Thus, it will be necessary to modify these distribution means in order, on the one hand, to ensure the distribution but also in order to ensure the absorption of the weight of the bed. Furthermore, with the axis horizontal, the weight of the beds and of the distribution means will be retransmitted to the plates 4 and 5 at the points of attachment of the distribution means 6 to the plates 4 and 5, whereas, with the axis vertical, the absorption of the strains was distributed over the entire width of the bed. The change of the tank to the horizontal axis will thus weaken the absorption of the weights of the beds by the plates 4 and 5, with the result that major modifications are necessary.

Furthermore, the system of [FIG. 2] results in major head losses because the fluid passes radially through the beds several times between its entry into the tank and its exit.

Thus, to position a heat storage and recovery tank with the axis horizontal requires further thought and additional modifications in order to render the system economically viable and technically competitive.

The invention relates to a heat storage and recovery system comprising at least one cylindrical external wall, at least one first volume, at least one second volume and at least two fluid injection/withdrawal means, for example an injector. Each of the injection/withdrawal means is associated with a different volume and these systems are preferably reversible in order to be used alternately in fluid injection and then in fluid withdrawal. Preferably, each volume is connected to a different injection/withdrawal means (preferably to just one injection/withdrawal means). For example, the system can comprise two volumes and two injections/withdrawal means. The first and second volumes are separated by at least one heat storage means comprising at least one bed of heat storage particles. Furthermore, the storage means and the first and second volumes extend substantially over the entire axial length of the cylindrical external wall. Thus, a fluid, preferably a gas, preferentially air, is injected by one of the injection/withdrawal means into the system. Furthermore, the system can be configured in order for a fluid arriving by an injection/withdrawal means to be able to pass through the heat storage means in order to pass from one volume to the other (from the first volume to the second volume and/or vice versa). The fluid, which for example arrives hot, then enters a first volume of the system, then it transversely (for example radially) passes through the heat storage means comprising the bed of storage particles, before reaching the second volume and exiting by another injection/withdrawal means associated with the second volume. Thus, the fluid passes through the storage means once only, which limits the head losses and thus improves the performance qualities of the system. When it passes through the bed of storage particles, the fluid transmits its heat to the storage particles. It then exits colder. This operation constitutes the charging of the system.

The terms "cold" and "hot" should be understood as relative during the operation of the system.

Conversely, during the discharging operation of the system, the fluid arrives cold by an injection and withdrawal means and enters a first volume, then it passes transversely through the storage means. It then recovers the heat from the bed of storage particles, which heat had been stored in the bed during the charging operation. It then exits into a second volume hotter and exits from the system by another injection/withdrawal means associated with the second volume The longitudinal axis of the cylindrical external wall is horizontal, which makes it possible to reduce the visual bulk and to facilitate the handling/lifting operations. This is because the height of the system is limited by the diameter of the cylindrical external wall, which is of the order of a few metres, in order to avoid a significant impact on the weight and the cost of the heat storage and recovery system.

The system according to the invention thus makes it possible to respond to the technical problem while maintaining the heat storage and recovery thermal performance qualities of the system, in particular by the decrease in the head losses and by the preservation of the length of the bed of storage particles.

Advantageously, the system can comprise a thermal insulation positioned on the internal surface of the said cylindrical external wall. Thus, the cylindrical external wall is protected from the temperature, which prevents excessively great thermal expansions of this wall. Furthermore, the positioning of the thermal insulation internally makes it possible to better contain the heat in the tank formed by the cylindrical external wall. Thus, the thermal performance qualities of the system are improved.

When the thermal insulation has a constant thickness, the homogeneity in distribution of the temperatures is improved. This is in particular the case when the thermal insulation has an annular section or at least an annular section portion.

According to a first embodiment of the system according to the invention, the system can comprise at least one distribution means extending along the storage means, on at least one surface of the storage means facing the said first or second volume. Preferably, the system can comprise two distribution means, on a surface of the storage means facing the said first volume and on a surface of the storage means facing the second volume. Thus, the distribution of the fluid in the storage means is improved and the heat is then better stored in the bed of particles or better recovered from the bed of storage particles.

Advantageously, at least one distribution means can comprise porous walls or walls having orifices. For this reason, the distribution of the fluid in the storage means is facilitated and improved, without requiring complex distribution means. Furthermore, the use of porous walls makes it possible to improve the heat storage capacity, the porous wall participating in the storage of the heat.

Preferentially, the cross section of the storage means can have a substantially constant thickness. Thus, the distribution of the fluid in the storage means is improved. This is because, by maintaining a constant thickness, the head losses are constant as the fluid passes through. No preferential pathway for passage of fluid in the storage means, which might exist in the zones where the head losses were reduced, is then created.

According to one embodiment of the system according to the invention, each storage means can be delimited by two substantially vertical planes. For this reason, the vertical planes are used to keep the bed of storage particles in position and optionally for the facilitated installation of horizontal grids for the absorption of the weight of the bed. These vertical planes also make it possible to delimit the spaces for at least one first and at least one second volume and a volume for the installation of the storage means. These vertical planes extend over the entire axial length of the cylindrical external wall.

According to one alternative form of the invention, each storage means can have a substantially rectangular section, preferably a substantially square section. Such a configuration makes possible a simple implementation of the storage means while providing good heat exchange performance qualities, in particular by a constant width. The square section makes possible a greater bed width than the rectangular section, which makes possible a less abrupt thermal gradient in the bed of storage particles.

Advantageously, the system can comprise two storage means, the said two storage means being symmetrical with respect to the vertical axis passing through the centre of the cylindrical external wall. Thus, the volume delimited by the two storage means is preferably the hot volume, that is to say the volume by which the hot fluid arrives before passing through the storage means in which it will exchange heat with the storage particles or by which the fluid arriving cold in the storage system emerges after having recovered the heat of the storage particles on passing through the storage means.

The other two volumes generated in the system and delimited by one of the storage means and by the cylindrical external wall are used, on the contrary, as cold volumes. This is because, by such a configuration, the volume delimited by the two storage means is at the centre, which makes it possible to limit the head losses by the cylindrical external wall. Furthermore, by the symmetry of the system, the stream is equitably divided into two branches, formed by the two external volumes located between one of the storage means and the cylindrical external wall. This homogeneous distribution makes possible a better heat storage/recovery.

According to one implementation of the invention, the storage means can be set down on a horizontal slab. The production of this horizontal slab is simple and makes possible ready installation of the storage means above the slab. Furthermore, this slab makes possible an absorption of the weight of the storage means and makes it possible to distribute this weight over a greater area of the cylindrical external wall, which makes it possible to prevent peaks of concentration of local stresses on the cylindrical external wall.

Advantageously, the horizontal slab is a concrete slab.

According to an alternative form of the invention, the storage means can comprise a pipe portion off-centre with respect to the axis of the cylindrical external wall. An internal pipe or an internal pipe portion can advantageously be installed in the volume delimited by the cylindrical external wall. The storage means is contained in this pipe or in this pipe portion (subsequently, the terminology "pipe portion" will only be used). This configuration makes it possible to have a volume delimited by the internal volume of the pipe portion, which can advantageously be used for the hot volume. This is because this configuration makes it possible to limit the heat losses by the cylindrical external wall.

Furthermore, when the pipe portion is set down on a horizontal slab, the installation of the pipe portion in the system is simplified. Furthermore, the horizontal slab can comprise an insulating part making it possible again to limit the heat losses to the outside.

The off-centring of the pipe portion makes possible a simple preparation of the system. This is because to ensure the concentricity of the pipe portion with the cylindrical external wall would require either fixing lugs at least in part around the pipe portion or a very thick horizontal slab. The fixing lugs would then be difficult to install in an environment having the external wall with the axis horizontal. Moreover, these lugs would then have to absorb the weight of the pipe portion, which, on the one hand, would complicate their suitable design/production and, on the other hand, would further complicate the installation of the lugs and of the pipe portion in the system. The use of a very thick horizontal slab making possible a concentricity of the pipe portion with the cylindrical external wall cannot be envisaged either as the thickness would be such that it would be necessary to provide means for ensuring a homogeneous hardening of the wall, preferably made of concrete, in order to ensure preventing of any cracking. Furthermore, the thickness of the slab would limit the volume necessary for the passage of the gas, which is not at all desirable.

The invention also relates to a system for the storage and recovery of energy by compressed gas comprising at least one gas compression means (such as a compressor or a pump), at least one means of storage of the compressed gas (such as a tank), at least one means of expansion of the compressed gas (such as a turbine) in order to generate energy, and at least one heat storage and recovery system according to one of the preceding characteristics. This is because the heat storage and recovery system makes it possible to improve the heat storage performance qualities, while facilitating the lifting/handling operations, in particular for large storage volumes. It is thus suitable for its use in a system for the storage and recovery of energy by compressed gas, in particular AACAES. It thus makes possible a good cost-energy storage/recovery compromise.

Advantageously, the gas can be air, preferably air from the ambient environment. This is because air is a compressible fluid and its withdrawal from the ambient environment makes it possible to avoid an additional cost in the system. Furthermore, numerous compression/expansion means, such as compressors/turbines, are suitable for operation with compressed air. This thus makes possible a broad choice of machines of this type.

Furthermore, the invention also relates to a process for the storage and recovery of energy by compressed air comprising at least the following stages:
- a stage of compression of a gas,
- a stage of storage of heat (cooling of the gas) in a heat storage and recovery system according to one of the preceding characteristics,
- a stage of storage of the compressed gas,
- a stage of recovery of the heat (reheating of the gas) in the heat storage and recovery system,
- a stage of expansion of the compressed gas.

By virtue of the storage and recovery system described, the cost-energy storage/recovery compromise of the process is improved.

[FIG. 3] illustrates, diagrammatically and non-limitingly, a sectional drawing along a plane orthogonal to the longitudinal axis of the cylindrical external wall 51 according to a first embodiment of the invention.

In this figure, an insulating wall 40 is positioned on the internal surface of the cylindrical external wall 51, the axis of which is substantially horizontal. This insulating wall 40 makes it possible to prevent escapes of heat towards the cylindrical external wall 51, which makes it possible to improve the heat storage and recovery performance qualities of the system. It has a substantially constant thickness thanks to a substantially annular section. The axis yy represents the vertical axis. A horizontal slab 44, preferably made of concrete, is positioned on the bottom (in the vertical direction) of the cylindrical external wall 51 and of the insulating wall 40. This horizontal slab 44 makes possible the installation and the fixing of a pipe portion 20 which acts as storage means and which comprises a bed of heat storage particles, for example concrete beads or also particles of phase-change material. The pipe portion 20 is off-centre with respect to the axis of the cylindrical external wall 51, so as to avoid use of a very thick horizontal slab which would unnecessarily limit the volume available inside the cylindrical external wall 51. The horizontal concrete slab 44 can also have the advantage of acting as additional heat storage repository.

The system of [FIG. 3] makes it possible to delimit two distinct volumes. A first volume 30 is delimited, on the one hand, by the internal surface of the pipe portion 20 and by the horizontal surface of the horizontal slab 44. A second volume 31 is delimited by the external surface of the pipe portion 20, a part of the horizontal surface of the horizontal slab 44 and the internal surface of the insulating wall 40. A fluid, such as a gas, preferably air, can move in these two volumes 30 and 31. The first volume 30, the furthest from the cylindrical external wall 51, is preferably the hot volume, while the second volume 31 is preferably the cold volume. Thus, the heat losses are reduced.

The operation of the system is as follows:

During the Charging Phase:
- the hot fluid arrives in the first volume 30 by a first injection/withdrawal means (not visible).
- the fluid passes transversely, substantially radially, according to the axis of the pipe portion 20, through the storage means formed by the pipe portion 20. During this crossing, the fluid exchanges heat with the storage particles, which are then initially cold. The storage particles heat up while the fluid cools down.
- the fluid emerges cold in the second volume 31 and emerges from the system by a second injection/withdrawal means (not visible).

During the Discharging Phase:
- the cold fluid arrives in the second volume 31 by the second injection/withdrawal means.
- the fluid passes transversely, substantially radially, according to the axis of the pipe portion 20, through the storage means formed by the pipe portion 20 in the substantially reverse direction to the charging phase. During this crossing, the fluid exchanges heat with the storage particles, which are then initially hot. The storage particles cool down while the fluid heats up.
- the fluid emerges hot in the first volume 30 and emerges from the system by the first injection/withdrawal means.

In order to make such an operation possible, it is preferable for the injection/withdrawal means, such as valves, to be reversible, that is to say for them to make possible the movement of the fluid in both the operating directions.

[FIG. 4] illustrates, diagrammatically and non-limitingly, a sectional drawing along a plane orthogonal to the longitudinal axis of the cylindrical external wall 51 according to a second embodiment of the invention. The axis A represents the vertical axis.

In this figure, an insulating wall is positioned on the internal surface of the cylindrical external wall 51, the axis of which is substantially horizontal. The insulating wall is formed of several parts 100, 110 and 120. The parts 100 have only a thermal insulation function; the parts 110 have both a thermal insulation function and a function of absorbing the weight of the storage means 200, the parts 120 have only a thermal insulation function and they can be omitted, unlike the parts 100 and 110. The parts 100, 110 and 120 form, grouped together, a thermal insulation wall of annular section.

The system comprises two storage means 200. These two storage means 200 are substantially symmetrical with respect to the vertical axis A. Each storage means 200 comprises at least one bed of heat storage particles. Furthermore, each of these storage means 200 is delimited by two parallel vertical planes. Each of the storage means 200 is in contact in the upper part with a portion of insulating wall 100 and in the lower part with a portion of insulating wall 110, so as to prevent heat losses.

The system thus produced defines three volumes:
- a central volume 300 located between the two storage means 200 and delimited, in the upper and lower part, by portions of insulating wall 100, the aim of which is to prevent heat losses.
- two external volumes 310 delimited, on the one hand, by one of the storage means 200 and, on the other hand, either by the portion of insulating wall 120 or by the cylindrical external wall 51, when the part of insulating wall 120 is omitted.

Preferably, the central volume 300 is the hot volume; this is why the portions of insulating walls 100 delimiting this volume cannot be omitted; and the external volumes 310 are cold volumes. Thus, the heat losses are reduced.

Thus, the operation of the system is as follows:

During the Charging Phase:
- the hot fluid arrives in the central volume 300 by a first injection/withdrawal means (not visible).
- the fluid passes transversely, substantially perpendicularly to the parallel planes of the two storage means 200, through the two storage means 200. Thus, the stream arriving in the volume 300 is divided into two streams, each of these two streams being directed towards one of the two storage means 200. The symmetry of the system makes it possible to equitably divide the initial stream into two streams. During the crossing of the fluid in the storage means 200, the fluid exchanges heat with the storage particles, which are then initially cold. The storage particles heat up while the fluid cools down.
- the fluid emerges cold in the two external volumes 310 and emerges from the system by a second and a third injection/withdrawal means (not visible), each of the second and third injection/withdrawal means being connected to one of the two external volumes 310.

During the Discharging Phase:
- the cold fluid arrives in the two external volumes 310 by the second and third injection/withdrawal means.
- the fluid passes transversely, substantially perpendicularly to the parallel planes of the two storage means 200, through the two storage means 200. During this crossing, the fluid exchanges heat with the storage particles, which are then initially hot. During this crossing, the movement of the fluid is in a direction substantially the reverse of that of the charging mode. The storage particles cool down while the fluid heats up.
- the fluid emerges hot from each of the two storage means 200 in the central volume 300. The two streams thus join to form a single stream which emerges from the system by the first injection/withdrawal means.

In order to make such an operation possible, it is preferable for the injection/withdrawal means, such as valves, to be reversible, that is to say for them to make possible the movement of the fluid in both the operating directions.

[FIG. 5] illustrates, diagrammatically and non-limitingly, a sectional drawing along a plane orthogonal to the longitudinal axis of the cylindrical external wall 51 according to a third embodiment of the invention. The axis A represents the vertical axis.

In this figure, an insulating wall is positioned on the internal surface of the cylindrical external wall 51, the axis of which is substantially horizontal. The insulating wall is formed of several parts 410 and 411. The parts 410 have only a thermal insulation function; the parts 411 have both a thermal insulation function and a function of absorbing the weight of the storage means 200.

The system comprises a single storage means 200 of square section in a plane orthogonal to the longitudinal axis of the cylindrical external wall 51. Moreover, this storage means 200 is delimited by two parallel and vertical planes, having a direction colinear with the longitudinal axis of the cylindrical external wall 51 and a vertical direction. The storage means 200 comprises at least one bed of heat storage particles. The storage means 200 is in contact in the upper part with a portion of insulating wall 410 and in the lower part with a portion of insulating wall 411, so as to prevent heat losses. The shape of the insulating wall above and below the vertical storage means is designed to fill in the space between the parallelepiped which forms the storage means 200 and the cylindrical volume part delimited by the cylindrical external wall 51. Thus, the sections, in a plane orthogonal to the longitudinal axis of the wall, of the insulating wall parts located above and below the storage means are delimited by a circle portion, two vertical planes and a horizontal plane, the two vertical planes corresponding to the parallel vertical planes of the storage means, the circle portion to a portion of the internal diameter of the cylindrical external wall 51 and the horizontal plane to the upper or lower surface of the storage means 200.

The system thus produced defines two volumes for the passage of a fluid: a first volume 305 and a second volume 315 each located between one of the vertical surfaces of the storage means 200 and a part of the cylindrical external wall 51 (or a portion of insulating wall 410 when it is installed on the cylindrical external wall 51).

Thus, the operation of the system is as follows:

During the Charging Phase:
- the hot fluid arrives in one of the two volumes 305 or 315 by a first injection/withdrawal means (not visible).
- the fluid passes transversely, substantially perpendicularly to the parallel planes of the storage means 200, through the storage means 200. During the crossing of the fluid in the storage means 200, the fluid exchanges heat with the storage particles, which are then initially cold. The storage particles heat up while the fluid cools down.
- the fluid emerges cold in the other of the two volumes 305 and 315 and then it emerges from the system by a second injection/withdrawal means (not visible), the second injection/withdrawal means being connected to this volume 305 or 315.

During the discharging phase, the movement can be identical to that of the charging phase. During the crossing of the fluid in the storage means 200, the storage particles cool down by transmitting their heat to the fluid, which heats up. Alternately, the movement can be reversed with respect to the charging phase:
- the cold fluid arrives in one of the volumes 305 or 315 by the second injection/withdrawal means.
- the fluid passes transversely, substantially perpendicularly to the parallel planes of the storage means 200, through the storage means 200. During this crossing, the fluid exchanges heat with the storage particles, which are then initially hot. The storage particles cool down while the fluid heats up.
- the fluid emerges hot from the storage means 200 and reaches the other of the volumes 305 or 315, then it emerges from the system by the first injection/withdrawal means.

In comparison with the operation of FIG. 4, this configuration of FIG. 5 makes it possible to have a greater storage means width. Storage means width is understood to mean the dimension by which the fluid passes through the storage means. In FIG. 4 or FIG. 5, the width is thus the distance between the two vertical planes of the storage means 200. By increasing the width, the thermal gradient within the storage means is spread out more gradually along this storage means 200 width, which makes it possible to better store/recover the heat.

FIG. 6 illustrates a system for the storage and recovery of energy by compressed gas comprising at least one gas compression means 16 (such as a compressor or a pump), at least one heat storage and recovery system 22 according to one of the preceding characteristics, at least one means of storage of the compressed gas 30 (such as a tank), and at least one means of expansion of the compressed gas 17 (such as a turbine) in order to generate energy.

Besides the advantages already touched on, the invention makes it possible to facilitate the at least partial burial of the system in view of the reduced vertical height. Burial makes it possible to contain a large part of the system in the event of bursting. Furthermore, the reduction in the height makes possible operations of inspection of service in safety easier and optional maintenance operations simpler, without carrying out inspection or operations at very great height.

The invention claimed is:

1. A heat storage and recovery system comprising at least one cylindrical external wall, the heat storage and recovery system comprising at least one first volume, at least one second volume and at least two fluid injection/withdrawal means, the first and second volumes being separated by at least one heat storage means comprising at least one bed of heat storage particles, wherein the heat storage means and the first and second volumes extend substantially over the entire axial length of the cylindrical external wall and wherein the longitudinal axis of the cylindrical external wall is horizontal.

2. The storage and recovery system according to claim 1, wherein the system comprises a thermal insulation positioned on the internal surface of the cylindrical external wall.

3. The storage and recovery system according to claim 1, wherein the system comprises at least one distribution means extending along the storage means, on at least one surface of the heat storage means facing the first or second volume.

4. The storage and recovery system according to claim 3, wherein the at least one distribution means comprises porous walls or walls having orifices.

5. The storage and recovery system according to claim 1, wherein a cross section of the heat storage means has a substantially constant thickness.

6. The storage and recovery system according to claim 5, wherein the at least one heat storage means comprises a plurality of heat storage means, and each heat storage means is delimited by two substantially vertical planes.

7. The storage and recovery system according to claim 6, wherein each heat storage means has a substantially rectangular section.

8. The storage and recovery system according to claim 6, wherein the system comprises two heat storage means, the two heat storage means being symmetrical with respect to the vertical axis (A) passing through the centre of the cylindrical external wall.

9. The storage and recovery system according to claim 6, wherein each heat storage means has a substantially square section.

10. The storage and recovery system according to claim 1, wherein the heat storage means is set down on a horizontal slab.

11. A system for the storage and recovery of energy by compressed gas comprising at least one gas compression means, at least one means of storage of the compressed gas, at least one means of expansion of the compressed gas in order to generate energy, and at least one heat storage and recovery system according to claim 1.

12. The system for the storage and recovery of energy by compressed gas according to claim 11, for which the gas is air, preferably air of the ambient environment.

13. A process for the storage and recovery of energy by compressed air comprising at least the following stages:
    a stage of compression of a gas,
    a stage of storage of heat in the heat storage and recovery system according to claim 1,
    a stage of storage of the compressed gas,
    a stage of recovery of the heat in the heat storage and recovery system,
    a stage of expansion of the compressed gas.

14. The storage and recovery system according to claim 1, wherein the system comprises two distribution means on a surface of the heat storage means facing the first volume and on a surface of the heat storage means facing the second volume.

15. The storage and recovery system according to claim 1, wherein a radial cross section of the heat storage means has a substantially constant thickness.

16. A storage and recovery system comprising at least one cylindrical external wall, the heat storage and recovery system comprising at least one first volume, at least one second volume and at least two fluid injection/withdrawal means, the first and second volumes being separated by at least one heat storage means comprising at least one bed of heat storage particles, wherein the heat storage means and the first and second volumes extend substantially over the entire axial length of the cylindrical external wall, wherein the longitudinal axis of the cylindrical external wall is horizontal, and wherein the heat storage means comprises a pipe portion off-centre with respect to the axis of the cylindrical external wall.

17. The storage and recovery system according to claim 16, wherein the system comprises a thermal insulation positioned on the internal surface of the cylindrical external wall.

18. The storage and recovery system according to claim 16, wherein the system comprises at least one distribution means extending along the storage means, on at least one surface of the heat storage means facing the first or second volume.

19. The storage and recovery system according to claim 18, wherein the at least one distribution means comprises porous walls or walls having orifices.

20. The storage and recovery system according to claim 16, wherein the heat storage means is set down on a horizontal slab.

* * * * *